US012674112B2

(12) United States Patent
Kato et al.

(10) Patent No.: US 12,674,112 B2
(45) Date of Patent: Jul. 7, 2026

(54) LUBRICATING OIL COMPOSITION

(71) Applicant: IDEMITSU KOSAN CO.,LTD., Chiyoda-ku (JP)

(72) Inventors: Shota Kato, Chiba (JP); Keiichi Narita, Chiba (JP); Hiroaki Koshima, Chiba (JP); Kenichi Ogata, Chiba (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 18 days.

(21) Appl. No.: 18/005,206

(22) PCT Filed: Jul. 21, 2021

(86) PCT No.: PCT/JP2021/027356
§ 371 (c)(1),
(2) Date: Jan. 12, 2023

(87) PCT Pub. No.: WO2022/019333
PCT Pub. Date: Jan. 27, 2022

(65) Prior Publication Data
US 2023/0265353 A1     Aug. 24, 2023

(30) Foreign Application Priority Data
Jul. 22, 2020     (JP) ................................. 2020-125675

(51) Int. Cl.
| | |
|---|---|
| *C10M 111/02* | (2006.01) |
| *C10M 101/00* | (2006.01) |
| *C10M 105/34* | (2006.01) |
| *C10M 105/36* | (2006.01) |
| *C10N 30/02* | (2006.01) |
| *C10N 40/00* | (2006.01) |
| *H02K 9/19* | (2006.01) |

(52) U.S. Cl.
CPC ......... *C10M 111/02* (2013.01); *C10M 101/00* (2013.01); *C10M 105/34* (2013.01); *C10M 105/36* (2013.01); *C10M 2203/1006* (2013.01); *C10M 2207/2815* (2013.01); *C10M 2207/2825* (2013.01); *C10N 2030/02* (2013.01); *C10N 2040/40* (2020.05); *H02K 9/19* (2013.01)

(58) Field of Classification Search
CPC .............. C10M 111/02; C10M 101/00; C10M 105/34; C10M 105/36; C10M 2203/1006; C10M 2207/2815; C10M 2207/2825; C10M 2201/02; C10M 2207/0225; C10N 2030/02; C10N 2040/40; C10N 2020/017; C10N 2040/14; C10N 2040/25; H02K 9/19; Y02T 10/64
See application file for complete search history.

(56) References Cited

U.S. PATENT DOCUMENTS

| | | | | |
|---|---|---|---|---|
| 2010/0261628 A1* | 10/2010 | Scherer | ................ | C10M 105/36 560/190 |
| 2012/0012076 A1* | 1/2012 | Atkinson | ............. | C10M 169/04 123/1 A |
| 2012/0264661 A1* | 10/2012 | Tsubouchi | ........... | C10M 105/04 508/110 |
| 2012/0283162 A1 | 11/2012 | Tsubouchi | | |

FOREIGN PATENT DOCUMENTS

| | | | | | |
|---|---|---|---|---|---|
| EP | 2520637 | * | 11/2012 | | |
| EP | 2520637 | A1 * | 11/2012 | .......... | C10M 105/18 |
| JP | 60-255894 | A | 12/1985 | | |
| JP | 2009-242547 | A | 10/2009 | | |
| JP | 2009242547 | * | 10/2009 | | |
| JP | 2011201953 | * | 10/2011 | | |
| JP | 2012017391 | * | 1/2012 | | |
| JP | 2012-87269 | A | 5/2012 | | |
| JP | 2012-131879 | A | 7/2012 | | |
| JP | 2018-90729 | A | 6/2018 | | |
| JP | 6655607 | B2 | 2/2020 | | |
| WO | WO2008061709 | * | 5/2008 | | |
| WO | WO 2016/167176 | A1 | 10/2016 | | |
| WO | WO 2019/189502 | | 10/2019 | | |

OTHER PUBLICATIONS

Ravotti et al., Investigation of the Thermal Properties of Diesters from methanol, 1-pentanol, and 1-decanol as sustainable phase change materials, Materials 2020, 13, 810; doi: 10.3390/ma13040810 (Year: 2020).*
International Search Report issued Oct. 19, 2021 in PCT/JP2021/027356 filed on Jul. 21, 2021, 3 pages.
Extended European Search Report issued Jul. 29, 2024 in European Patent Application No. 21847254.6, 7 pages.
Office Action issued Dec. 3, 2024, in corresponding Japanese Patent Application No. 2022-538043 with English translation, 6 pages.
Office Action issued Dec. 30, 2024, in corresponding Chinese Patent Application No. 202180048467.1 with English translation, 20 pages.
European Office Action issued Jul. 3, 2025 in European Patent Application No. 21847254.6, 3 pages.

(Continued)

*Primary Examiner* — Cephia D Toomer
(74) *Attorney, Agent, or Firm* — Oblon, McClelland, Maier & Neustadt, L.L.P.

(57) ABSTRACT

A lubricating oil composition may be superior in cooling performance, ensure electrical insulation, and have a high flash point. Such a lubricating oil composition may include a base oil (A) including an ester-based synthetic oil (A1), the content of the ester-based synthetic oil (A1) is 30% by mass to 100% by mass based on the total amount of the base oil (A), the ester-based synthetic oil (A1) is one or more of an ester (A1-1) of a monohydric alcohol and a monobasic acid and an ester (A1-2) of a monohydric alcohol and a polybasic acid, and the base oil (A) satisfies requirements (1) to (3): Requirement (1): the kinematic viscosity at 40° C. is 2.00 mm²/s to 4.00 mm²/s. Requirement (2): the specific heat at 20° C. is 1.75 kJ/(kg·K) or less. Requirement (3): the density at 20° C. is 0.850 g/cm³ or more.

18 Claims, No Drawings

(56) References Cited

OTHER PUBLICATIONS

Chinese Office Action issued Jul. 12, 2025 in Chinese Patent Application No. 202180048467.1 (with English translation), 17 pages.

Office Action issued Jan. 16, 2026, in corresponding Chinese Patent Application No. 202180048467.1, with English translation, 17 pages.

Office Action issued Mar. 25, 2026, in corresponding Chinese Patent Application No. 202180048467.1, with English translation, 14 pages.

* cited by examiner

LUBRICATING OIL COMPOSITION

CROSS-REFERENCE TO RELATED APPLICATIONS

The present application is the national stage of international application PCT/JP2021/027356, filed on Jul. 21, 2021, and claims the benefit of the filing date of Japanese Appl. No. 2020-125675, filed on Jul. 22, 2020.

TECHNICAL FIELD

The present invention relates to a lubricating oil composition, for example, a lubricating oil composition for use for cooling an electric vehicle device.

BACKGROUND ART

Recently, from the viewpoint of global environment protection, carbon dioxide reduction is greatly desired. In the field of automobiles, the development of fuel economy technology is intensive, and hybrid vehicles and electric vehicles (hereinafter these can also be referred to as "electric vehicles"), which are vehicles excellent in fuel consumption and environmental performance, have been widely used. Cooling oil excellent in cooling performance and electrical insulation is required for electric vehicle devices of electric vehicles. Since some electric vehicles have a gear reducer, the cooling oil for these need to have lubricity in addition to the above performance.

As a cooling oil for electric vehicle devices, a lubricating oil composition such as an existing automatic transmission fluid (hereinafter also referred to as "ATF") or a continuous variable transmission fluid (hereinafter also referred to as "CVTF") is mainly used, but various cooling oils are being developed instead of these.

For example, PTL 1 proposes a lubricating oil composition (vehicle transmission oil composition), which contains an ester-based synthetic oil in an amount of 10% by mass to 100% by mass based on the total amount of the base oil therein, and of which the kinematic viscosity at 40° C., the viscosity index and the density at 15° C. have been controlled to fall within a predetermined range.

CITATION LIST

Patent Literature

PTL 1: JP 2009-242547 A

SUMMARY OF INVENTION

Technical Problem

In recent years, focusing on further improvement of the spread of electric vehicles, further improvement of the performance of electric vehicles, or the like lubricating oil compositions used as cooling oils are required to further improve the cooling performance. Further, lubricating oil compositions used as cooling oils are required to have a high flash point from the viewpoint of safety.

In order to improve the cooling performance of lubricating oil compositions used as cooling oils, it is effective to reduce the viscosity and the density of the lubricating oil compositions. However, when the viscosity of lubricating oil compositions is reduced, the flash point thereof tends to lower.

Therefore, the improvement of the cooling performance of lubricating oil compositions used as cooling oils and the increase in the flash point thereof are in a trade-off relationship, and there is a problem that it is difficult to achieve the balance.

The present invention has been made in consideration of the performance required for lubricating oil compositions for use as cooling oils and the above-mentioned problem, and an object thereof is to provide a lubricating oil composition which is superior in cooling performance, ensures electrical insulation and has a high flash point.

Solution to Problem

The present inventors have made assiduous studies for the purpose of attaining the above-mentioned object, and have completed the following invention.

Specifically, the present invention relates to the following [1] to [3].

[1] A lubricating oil composition containing a base oil (A), wherein:

the base oil (A) contains an ester-based synthetic oil (A1), the content of the ester-based synthetic oil (A1) is 30% by mass to 100% by mass based on the total amount of the base oil (A), the ester-based synthetic oil (A1) is one or more selected from the group consisting of an ester (A1-1) of a monohydric alcohol and a monobasic acid and an ester (A1-2) of a monohydric alcohol and a polybasic acid, and the base oil (A) satisfies the following requirements (1) to (3):

Requirement (1): the kinematic viscosity at 40° C. is 2.00 $mm^2/s$ to 4.00 $mm^2/s$, Requirement (2): the specific heat at 20° C. is 1.75 kJ/(kg·K) or less, Requirement (3): the density at 20° C. is 0.850 $g/cm^3$ or more.

[2] A use method of using the lubricating oil composition of the above [1] for cooling an electric vehicle device.

[3] A cooling system for cooling an electric vehicle device, the cooling system being provided with the lubricating oil composition of the above [1].

Advantageous Effects of Invention

According to the present invention, there can be provided a lubricating oil composition which is superior in cooling performance, ensures electrical insulation and has a high flash point.

DESCRIPTION OF EMBODIMENTS

Embodiments of the present invention are described in detail hereinunder. The present invention is not limited to the following embodiments, and can be modified in any manner within a scope not overstepping the spirit thereof.

The upper limit and the lower limit of the numerical range described in the present description can be combined in any manner. For example, in the case describing "A to B" and "C to D", a range of "A to D" and a range of "C to B" are in the scope of the invention as numerical ranges. A numerical range of "a lower value to an upper value" described in the present description means a lower value or more and an upper value or less, unless otherwise specifically indicated.

Also in the present specification, the numerical values in Examples are numerical values that can be used as an upper value or a lower value.

Embodiment of Lubricating Oil Composition

The lubricating oil composition of the present invention is a lubricating oil composition containing a base oil (A), wherein:

the base oil (A) contains an ester-based synthetic oil (A1), the content of the ester-based synthetic oil (A1) is 30% by mass to 100% by mass based on the total amount of the base oil (A), the ester-based synthetic oil (A1) is one or more selected from the group consisting of an ester (A1-1) of a monohydric alcohol and a monobasic acid and an ester (A1-2) of a monohydric alcohol and a polybasic acid, and the base oil (A) satisfies the following requirements (1) to (3):

Requirement (1): the kinematic viscosity at 40° C. is 2.00 $mm^2/s$ to 4.00 $mm^2/s$.

Requirement (2): the specific heat at 20° C. is 1.75 kJ/(kg·K) or less.

Requirement (3): the density at 20° C. is 0.850 $g/cm^3$ or more.

The present inventors have made assiduous studies for the purpose of providing a lubricating oil composition which is superior in cooling performance, ensures electrical insulation and has a high flash point.

First, the present inventors have considered to lower the viscosity of the base oil in order to improve the cooling performance of a lubricating oil composition. However, as described above, in the case where the viscosity of the base oil is lowered, the flash point lowers, and therefore it is considered that the safety of the lubricating oil composition could not be secured.

However, the present inventors have made further studies and, as a result, have found that a base oil containing a specific amount of an ester-based synthetic oil and satisfying the requirements (1) and (2), and further the requirement (3) ensures electrical insulation and has a high flash point though having a low viscosity as in the requirement (1). Based on these findings, the present inventors have made still further studies and have completed the present invention.

Preferably, one embodiment of the lubricating oil composition of the present invention is composed of the base oil (A) alone, but can contain any other component than the base oil (A) within a range not detracting from the advantageous effects of the invention.

Specifically, in one embodiment of the lubricating oil composition of the present invention, the content of the base oil (A) is, from the viewpoint of more readily exhibiting the advantageous effects of the present invention, preferably 30% by mass to 100% by mass, more preferably 50% by mass to 100% by mass, even more preferably 60% by mass to 100% by mass, further more preferably 70% by mass to 100% by mass, further more preferably 80% by mass to 100% by mass, further more preferably 90% by mass to 100% by mass, further more preferably 95% by mass to 100% by mass, further more preferably 99% by mass to 100% by mass based on the total amount of the lubricating oil composition.

In the case where the lubricating oil composition of one embodiment of the present invention is composed of the base oil (A) alone, the lubricating oil composition can also be referred to as "lubricating base oil".

The base oil (A) is described in detail hereinunder.

<<Base Oil (A)>>

The lubricating oil composition of the present invention contains the base oil (A).

The base oil (A) contains the ester-based synthetic oil (A1).

The content of the ester-based synthetic oil (A1) is 30% by mass to 100% by mass based on the total amount of the base oil (A).

The base oil (A) in which the content of the ester-based synthetic oil (A1) is less than 30% by mass based on the total amount of the base oil (A) is poor in point of any one of the cooling performance, the electrical insulation and the flash point, and therefore could not exhibit the advantageous effects of the present invention.

Here, from the viewpoint of more readily exhibiting the advantageous effects of the present invention, the content of the ester-based synthetic oil (A1) is preferably 40% by mass to 100% by mass, more preferably 50% by mass to 100% by mass based on the total amount of the base oil (A).

Also from the viewpoint of more readily exhibiting the advantageous effects of the present invention, the content of the ester-based synthetic oil (A1) is preferably 30% by mass to 100% by mass, more preferably 40% by mass to 100% by mass, even more preferably 50% by mass to 100% by mass based on the total amount of the lubricating oil composition.

Also in the lubricating oil composition of the present invention, the ester-based synthetic oil (A1) is one or more selected from the group consisting of an ester (A1-1) of a monohydric alcohol and a monobasic acid and an ester (A1-2) of a monohydric alcohol and a polybasic acid.

Namely, the ester-based synthetic oil (A1) can be one or more selected from the ester (A1-1) of a monohydric alcohol and a monobasic acid, or can be one or more selected from the ester (A1-2) of a monohydric alcohol and a polybasic acid, or can be a combination of one or more selected from the ester (A1-1) of a monohydric alcohol and a monobasic acid and one or more selected from the ester (A1-2) of a monohydric alcohol and a polybasic acid.

Here, from the viewpoint of more readily exhibiting the advantageous effects of the present invention, the ester-based synthetic oil (A1) is preferably one or more selected from the ester (A1-2) of a monohydric alcohol and a polybasic acid.

With that, in the lubricating oil composition of the present invention, the base oil (A) satisfies the following requirements (1) to (3).

Requirement (1): The kinematic viscosity at 40° C. is 2.00 $mm^2/s$ to 4.00 $mm^2/s$.

Requirement (2): The specific heat at 20° C. is 1.75 kJ/(kg·K) or less.

Requirement (3): The density at 20° C. is 0.850 $g/cm^3$ or more.

The base oil (A) satisfying the above requirements (1) to (3) can be prepared, for example, by selecting the kind of the ester-based synthetic oil (A1) and by controlling the content thereof.

Hereinunder the requirements (1) to (3) are described in detail.

<Requirement (1)>

The requirement (1) defines that the kinematic viscosity at 40° C. of the base oil (A) is 2.00 $mm^2/s$ to 4.00 $mm^2/s$.

In the lubricating oil composition of the present invention, the kinematic viscosity at 40° C. (hereinafter also referred to as "40° C. kinematic viscosity") of the base oil (A) is extremely low; however, the base oil (A) satisfies the requirements (2) and (3) and further the content of the ester-based synthetic oil (A1) is defined to be a specific amount, and consequently, the cooling performance of the base oil (A) is made excellent though the flash point thereof is increased. Moreover, the electrical insulation of the base oil (A) is secured.

In the case where the 40° C. kinematic viscosity of the base oil (A) is less than 2.00 mm²/s, the flash point of the base oil (A) cannot be sufficiently increased. Also in the case where the 40° C. kinematic viscosity of the base oil (A) is more than 4.00 mm²/s, the cooling performance of the base oil (A) cannot be sufficiently improved.

Here, from the viewpoint of more readily exhibiting the advantageous effects of the present invention, the 40° C. kinematic viscosity of the base oil (A) as defined by the requirement (1) is preferably 2.00 mm²/s to 3.50 mm²/s, more preferably 2.00 mm²/s to 3.00 mm²/s, even more preferably 2.00 mm²/s or 2.50 mm²/s, further more preferably 2.00 mm²/s to 2.30 mm²/s.

Also from the viewpoint of more readily exhibiting the advantageous effects of the present invention, in the requirement (1), it is preferable that, in addition to the 40° C. viscosity of the base oil (A), the kinematic viscosity at 20° C. (hereinafter also referred to as "20° C. kinematic viscosity") of the base oil (A) is also within a specific range. Specifically, the 20° C. kinematic viscosity is preferably 3.00 mm²/s or more, more preferably 3.10 mm²/s or more, even more preferably 3.20 mm²/s or more, further more preferably 3.30 mm²/s or more. Also preferably, it is 5.50 mm²/s or less, more preferably 5.00 mm²/s or less, even more preferably 4.50 mm²/s or less, further more preferably 4.00 mm²/s or less. The upper limit and the lower limit of these numerical ranges can be combined in any manner. Specifically, the 20° C. kinematic viscosity is preferably 3.00 mm²/s to 5.50 mm²/s, more preferably 3.10 mm²/s to 5.00 mm²/s, even more preferably 3.20 mm²/s to 4.50 mm²/s, further more preferably 3.30 mm²/s to 4.00 mm²/s.

In the present specification, the 40° C. kinematic viscosity and the 20° C. kinematic viscosity of the base oil (A) are values measured or calculated according to JIS K2283:2000.

<Requirement (2)>

The requirement (2) defines that the specific heat at 20° C. of the base oil (A) is 1.75 kJ/(kg·K) or less.

"Specific heat" means an amount of heat necessary for raising the temperature of one gram of a substance by 1° C. (K), and a substance having a larger specific heat can be said to have a higher cooling performance. Accordingly, the definition of the requirement (2) is disadvantageous for increasing the cooling performance. However, the base oil (A) containing the ester-based synthetic oil (A1) and satisfying the requirement (1) tends to satisfy the requirement (2). Even though satisfying the requirement (2), the base oil (A) exhibits the unexpected effect of exhibiting an excellent cooling efficiency. Moreover, the base oil (A) can ensure electrical insulation, and has a high flash point.

As described above, the base oil (A) containing the ester-based synthetic oil (A1) and satisfying the requirement (1) tends to satisfy the requirement (2), and therefore it is difficult to prepare the base oil (A) satisfying the requirement (1) but not satisfying the requirement (2).

Here, from the viewpoint of more readily exhibiting the advantageous effects of the present invention, the specific heat at 20° C. of the base oil (A) as defined by the requirement (2) is preferably 1.50 kJ/(kg·K) or more, more preferably 1.53 kJ/(kg·K) or more, even more preferably 1.55 kJ/(kg·K) or more, further more preferably 1.57 kJ/(kg·K) or more. Also preferably, it is 1.75 kJ/(kg·K) or less, more preferably 1.72 kJ/(kg·K) or less, even more preferably 1.68 kJ/(kg·K) or less, further more preferably 1.64 kJ/(kg·K) or less. The upper limit and the lower limit of these numerical ranges can be combined in any manner. Specifically, it is preferably 1.50 kJ/(kg·K) to 1.75 kJ/(kg·K), more preferably 1.53 kJ/(kg·K) to 1.72 kJ/(kg·K), even more preferably 1.55 kJ/(kg·K) to 1.68 kJ/(kg·K), further more preferably 1.57 kJ/(kg·K) to 1.64 kJ/(kg·K).

In the present description, the specific heat at 20° C. of the base oil (A) means a value calculated according to the following formula (f1) in which a found value of thermal conductivity and a found value of thermal effusivity as measured with a thermal conductivity measuring apparatus, and a density at 20° C. as measured according to the method described hereinunder are used.

$$(\text{Specific heat at } 20° \text{ C.}) = (\text{thermal effusivity at } 20° \text{ C.})^2 / \{(\text{thermal conductivity at } 20° \text{ C.}) \times (\text{density at } 20° \text{ C.})\} \tag{f1}$$

<Requirement (3)>

The requirement (3) defines that the density at 20° C. of the base oil (A) is 0.850 g/cm³ or more.

A larger density means that the molecules to constitute the base oil (A) are filled densely, and it can be said that the cooling performance of the base oil (A) can be more readily enhanced.

Here, in general, a substance having a lower viscosity tends to have a smaller density, and the base oil (A) containing the ester-based synthetic oil (A1) and satisfying the requirement (A) tends to satisfy the requirement (3), and this contributes toward increasing the cooling performance. In other words, in the present invention, the base oil (A) satisfying the above-mentioned requirement (1) and requirement (3) that are contradictory to each other exhibits the unexpected effect of exhibiting an excellent cooling performance. Moreover, the base oil (A) ensures electrical insulation, and the base oil (A) has a high flash point.

In the case where the density at 20° C. of the base oil (A) is less than 0.850 g/cm³, the cooling performance of the base oil (A) cannot be sufficiently improved.

Here, from the viewpoint of more readily exhibiting the advantageous effects of the present invention, the density at 20° C. of the base oil (A) as defined by the requirement (3) is preferably 0.850 g/cm³ or more, more preferably 0.860 g/cm³ or more, even more preferably 0.900 g/cm³ or more, further more preferably 0.940 g/cm³ or more, further more preferably 0.970 g/cm³ or more, further more preferably 0.990 g/cm³ or more. Also preferably, it is 1.20 g/cm³ or less, more preferably 1.15 g/cm³ or less, even more preferably 1.12 g/cm³ or less, further more preferably 1.10 g/cm³ or less, further more preferably 1.08 g/cm³ or less, further more preferably 1.06 g/cm³ or less. The upper limit and the lower limit of these numerical ranges can be combined in any manner. Specifically, it is preferably 0.850 g/cm³ to 1.20 g/cm³, more preferably, 0.860 g/cm³ to 1.15 g/cm³, even more preferably 0.900 g/cm³ to 1.12 g/cm³, further more preferably 0.940 g/cm³ to 1.10 g/cm³, further more preferably 0.970 g/cm³ to 1.08 g/cm³, further more preferably 0.990 g/cm³ to 1.06 g/cm³.

In the present description, the density at 20° C. of the base oil (A) means a value measured according to JIS K 2249-1:2011 (Crude and Refined Products—Method for Measuring Density—Part 1: Oscillation Method).

<Requirements (4) to (7)>

In the lubricating oil composition of one embodiment of the present invention, preferably, the base oil (A) further satisfies one or more selected from requirements (4) to (7), more preferably satisfies two or more, even more preferably satisfies three or more, further more preferably satisfies four.

Among these, it satisfies a requirement of relative heat transfer coefficient defined by the requirement (5).

The base oil (A) satisfying the above requirements (4) to (7) can be prepared, for example, by selecting the kind of the ester-based synthetic oil (A1) and by controlling the content thereof.

Hereinunder the requirements (4) to (7) are described in detail.

(Requirement (4))

The requirement (4) defines that the thermal conductivity at 20° C. of the base oil (A) is 0.140 W/(m·K) or more.

The thermal conductivity is an index of heat transfer in the same substance (namely, in the base oil (A)), and a larger value of the thermal conductivity defined by the requirement (4) can readily improve the cooling performance of the base oil (A).

When the thermal conductivity at 20° C. of the base oil (A) is 0.140 W/(m·K) or more, the base oil (A) can have more excellent cooling performance.

Here, from the viewpoint of more readily exhibiting the advantageous effects of the present invention, the thermal conductivity at 20° C. of the base oil (A) defined by the requirement (4) is preferably 0.140 W/(m·K) or more, more preferably 0.143 W/(m·K) or more, even more preferably 0.148 W/(m·K) or more, further more preferably 0.152 W/(m·K), further more preferably 0.154 W/(m·K) or more, further more preferably 0.156 W/(m·K) or more. Also preferably, it is 0.170 W/(m·K) or less, more preferably 0.165 W/(m·K) or less, even more preferably 0.163 W/(m·K) or less, further more preferably 0.162 W/(m·K) or less, further more preferably 0.161 W/(m·K) or less, further more preferably 0.160 W/(m·K) or less.

The upper limit and the lower limit of these numerical ranges can be combined in any manner. Specifically, it is preferably 0.140 W/(m·K) to 0.170 W/(m·K), more preferably 0.143 W/(m·K) to 0.165 W/(m·K), even more preferably 0.148 W/(m·K) to 0.163 W/(m·K), further more preferably 0.152 W/(m·K) to 0.162 W/(m·K), further more preferably 0.154 W/(m·K) to 0.161 W/(m·K), further more preferably 0.156 W/(m·K) to 0.160 W/(m·K).

In the present description, the thermal conductivity at 20° C. of the base oil (A) means a thermal conductivity measured with a thermal conductivity measuring apparatus.

(Requirement (5))

The requirement (5) defines that the relative heat transfer coefficient at 20° C. of the base oil (A) is 1.05 or more.

The relative heat transfer coefficient is a heat transfer coefficient of the base oil (A) relative to the heat transfer coefficient at 20° C., referred to as 1.00, of a mineral oil (α) satisfying the following requirements (α1) to (α4).

Requirement (α1): The kinematic viscosity at 20° C. is 7.06 mm²/s.

Requirement (α2): The specific heat at 20° C. is 1.67 kJ/(kg·K).

Requirement (α3): The density at 20° C. is 0.857 g/cm³.

Requirement (α4): The thermal conductivity at 20° C. is 0.141 W/(m·K).

The heat transfer coefficient is an index of easiness of heat transfer between two substances (namely, the base oil (A) and a substance to be cooled).

The requirement (5) defines the heat transfer coefficient of the base oil (A) as a relative heat transfer coefficient based on the heat transfer coefficient of the mineral oil (α). It can be said that a larger relative heat transfer coefficient defined by the requirement (5) ensures excellent cooling performance.

A heat transfer coefficient at 20° C. of a fluid ($A_\alpha$, unit: W/(m²·K)) can be calculated according to the following formula (I).

$$A_\alpha = \frac{(A_{D20})^{1/3} \times (A_{C20})^{1/3} \times (A_{HC20})^{2/3}}{(A_{KV20})^{1/6}} \tag{I}$$

In the above formula (I), $A_{D20}$ is a density at 20° C. of a fluid (unit: g/cm³). $A_{C20}$ is a specific heat at 20° C. of a fluid (unit: kJ/(kg·K)). $A_{HC20}$ is a thermal conductivity at 20° C. of a fluid (unit: W/(m·K)). $A_{KV20}$ is a kinematic viscosity at 20° C. of a fluid (unit: mm²/s).

Here, from the viewpoint of more readily exhibiting the advantageous effects of the present invention, the relative heat transfer coefficient at 20° C. of the base oil (A) defined by the requirement (5) is preferably 1.10 or more, more preferably 1.15 or more, even more preferably 1.20 or more. In general, it is 1.60 or less.

(Requirement (6))

The requirement (6) defines that the flash point of the base oil (A) is 105° C. or higher.

When the flash point is 105° C. or higher, the base oil (A) is difficult to fire and the safety thereof is easily improved.

The base oil (A) that the lubricating oil composition of the present invention contains satisfies the above-mentioned requirements (1) to (3) and contains a specific amount of the ester-based synthetic oil (A1). Therefore, the flash point of the base oil (A) is high and the base oil (A) satisfying the requirement (6) is easy to prepare.

Here, the flash point defined by the requirement (6) is preferably 109° C. or higher, more preferably 112° C. or higher, even more preferably 115° C. or higher. The flash point of the base oil (A) satisfying the requirements (1) to (3) and containing a specific amount of the ester-based synthetic oil (A1) is generally 200° C. or lower.

In the present description, the flash point of the base oil (A) means a value measured by a Cleveland open-cup method (COC method) according to JIS K 2265-4:2007.

(Requirement (7))

The requirement (7) defines that the volume resistivity at 25° C. of the base oil (A) is 0.03×10⁷ Ω·m or more.

A higher volume resistivity means more excellent electrical insulation.

The base oil (A) that the lubricating oil composition of the present invention contains satisfies the above-mentioned requirements (1) to (3) and contains a specific amount of the ester-based synthetic oil (A1). Therefore, the electrical insulation of the base oil (A) is high and the base oil (A) satisfying the requirement (7) is easy to prepare.

Here, the volume resistivity at 25° C. defined by the requirement (7) is preferably 0.05×10⁷ Ω·m or more, more preferably 0.1×10⁷ Ω·m or more, even more preferably 0.5×10⁷ Ω·m or more, further more preferably 1.0×10⁷ Ω·m or more, further more preferably 4.0×10⁷ Ω·m or more, further more preferably 4.2×10⁷ Ω·m or more, further more preferably 4.4×10⁷ Ω·m or more, further more preferably 4.5×10⁷ Ω·m or more. The volume resistivity at 25° C. of the base oil (A) satisfying the requirements (1) to (3) and contains a specific amount of the ester-based synthetic oil (A1) is generally 1.0×10¹⁰ 9 m or less.

In the present description, the volume resistivity at 25° C. of the base oil (A) means a value measured under the condition of a measurement temperature 25° C. and an applied voltage 250 V, according to JIS C2101:1999.

<Ester-based Synthetic Oil (A1)>

The lubricating oil composition of the present invention uses, as the ester-based synthetic oil (A1), one or more selected from the group consisting of an ester (A1-1) of a monohydric alcohol and a monobasic acid and an ester (A1-2) of a monohydric alcohol and a polybasic acid.

From the viewpoint of preparing the base oil (A) that satisfies the requirements (1) to (3) and further satisfies the requirements (4) to (7), the ester (A1-1) of a monohydric alcohol and a monobasic acid and the ester (A1-2) of a monohydric alcohol and a polybasic acid are described in detail hereinunder.

(Ester (A1-1) of Monohydric Alcohol and Monobasic Acid)

From the viewpoint of more readily preparing the base oil (A) that satisfies the requirements (1) to (3) and further satisfies the requirements (4) to (7), the carbon number of the monohydric alcohol that constitutes the ester (A1-1) is preferably 1 to 24, more preferably 1 to 12, even more preferably 1 to 10.

The monohydric alcohol can be linear or branched, and can be saturated or unsaturated, but is, from the viewpoint of bettering flowability to improve low-temperature characteristics, preferably branched.

Specific examples of the monohydric alcohol to constitute the ester (A1-1) include methanol, ethanol, propanol, butanol, pentanol, hexanol, heptanol, octanol, nonanol, decanol, undecanol, dodecanol, tridecanol, tetradecanol, pentadecanol, hexadecanol, heptadecanol, octadecanol, nonadecaol, eicosanol, heneicosanol, docosanol, tricosanol and tetracosanol, as well as butenol, pentenol, hexenol, heptenol, octenol, nonenol, decenol, undecenol, dodecenol, tridecenol, tetradecenol, pentadecenol, hexadecenol, heptadecenol, octadecenol, nonadecenol, eicosenol, heneicosenol, dococenol, tricosenol and tetracocenol. These can be linear or branched.

The monobasic acid to constitute the ester (A1-1) is, from the viewpoint of more readily preparing the base oil (A) satisfying the requirements (1) to (3) and further satisfying the requirements (4) to (7), preferably a fatty acid having 2 to 16 carbon atoms, more preferably a fatty acid having 4 to 14 carbon atoms, even more preferably a fatty acid having 5 to 12 carbon atoms, further more preferably a fatty acid having 6 to 10 carbon atoms. The fatty acid can be linear or branched, and can be saturated or unsaturated.

Specific examples of the monobasic acid to constitute the ester (A1-1) include acetic acid, propionic acid, butanoic acid, pentanoic acid, hexanoic acid, octanoic acid (caprylic acid), nonanoic acid, decanoic acid, undecanoic acid, dodecanoic acid, tridecanoic acid, tetradecanoic acid, pentadecanoic acid and hexadecanoic acid, as well as acrylic acid, butenoic acid, pentenoic acid, hexenoic acid, heptenoic acid, octenoic acid, nonenoic acid, decenoic acid, undecenoic acid, dodecenoic acid, tridecenoic acid, tetradecenoic acid, pentadecenoic acid and hexadecenoic acid.

Here, preferred embodiments of a combination of the monohydric alcohol and the monobasic acid to constitute the ester (A1-1) are shown below.

A preferred combination: a monohydric alcohol having 1 to 24 carbon atoms and a fatty acid having 2 to 16 carbon atoms.

A more preferred combination: a monohydric alcohol having 1 to 12 carbon atoms and a fatty acid having 4 to 14 carbon atoms.

An even more preferred combination: a monohydric alcohol having 1 to 10 carbon atoms and a fatty acid having 5 to 12 carbon atoms.

A further more preferred combination: a monohydric alcohol having 1 to 10 carbon atoms and a fatty acid having 6 to 10 carbon atoms.

One kind alone or two or more kinds of the ester (A1-1) of a monohydric alcohol and a monobasic acid can be used either singly or as combined.

(Ester (A1-2) of Monohydric Alcohol and Polybasic Acid)

From the viewpoint of more readily preparing the base oil (A) satisfying the requirements (1) to (3) and further satisfying the requirements (4) to (7), the carbon number of the monohydric alcohol that constitutes the ester (A1-2) is preferably 1 to 12, more preferably 1 to 10, even more preferably 1 to 8, further more preferably 1 to 6, further more preferably 1 to 4.

The monohydric alcohol can be linear or branched, and can be saturated or unsaturated.

Specific examples of the monohydric alcohol to constitute the ester (A1-2) include methanol, ethanol, propanol, butanol, pentanol, hexanol, heptanol, octanol, nonanol, decanol, undecanol, and dodecanol, as well as butenol, pentenol, hexenol, heptenol, octenol, nonenol, decenol, undecenol, and dodecenol. These can be linear or branched.

The polybasic acid to constitute the ester (A1-2) is, from the viewpoint of more readily preparing the base oil (A) satisfying the requirements (1) to (3) and further satisfying the requirements (4) to (7), preferably a dibasic acid having 2 to 8 carbon atoms, more preferably a dibasic acid having 4 to 8 carbon atoms, even more preferably a dibasic acid having 5 to 7 carbon atoms. The dibasic acid can be linear or branched, and can be saturated or unsaturated.

Specific examples of the polybasic acid to constitute the ester (A1-2) include ethane-diacid, propane-diacid, butane-diacid, pentane-diacid, hexane-diacid (adipic acid), heptane-diacid, and octane-diacid, as well as butene-diacid, pentene-diacid, hexene-diacid, heptene-diacid, and octene-diacid.

Here, preferred embodiments of a combination of the monohydric alcohol and the dibasic acid to constitute the ester (A1-2) are shown below.

A referred combination: a monohydric alcohol having 1 to 12 carbon atoms and a dibasic acid having 2 to 8 carbon atoms.

A more preferred combination: a monohydric alcohol having 1 to 10 carbon atoms and a dibasic acid having 4 to 8 carbon atoms.

An even more preferred combination: a monohydric alcohol having 1 to 8 carbon atoms and a dibasic acid having 5 to 7 carbon atoms.

A further more preferred combination: a monohydric alcohol having 1 to 6 carbon atoms and a dibasic acid having 5 to 7 carbon atoms.

A further more preferred combination: a monohydric alcohol having 1 to 4 carbon atoms and a dibasic acid having 5 to 7 carbon atoms.

One kind alone or two or more kinds of the ester (A1-2) of a monohydric alcohol and a polybasic acid can be used either singly or as combined.

<Base Oil (A2) Other than Ester-Based Synthetic Oil (A1)>

In the lubricating oil composition of one embodiment of the present invention, the base oil (a) can contain any other base oil (A2) than the ester-based synthetic oil (A1) (hereinafter also simply referred to as "other base oil (A2)").

The content of the other base oil (A) is, from the viewpoint of more readily preparing the base oil (A) satisfying the requirements (1) to (3) and further satisfying the requirements (4) to (7), preferably 70% by mass or less, more preferably 60% by mass or less, even more preferably 50% by mass or less based on the total amount of the base oil (A).

The other base oil (A2) is not specifically limited so far as it can prepare the base oil (A) satisfying the requirements (1) to (3) and further satisfying the requirements (4) to (7), for which one or more selected from the group consisting of a mineral oil and a synthetic oil can be used.

Examples of the mineral oil include atmospheric residues obtained through atmospheric distillation of crude oils such as paraffin-based crude oils, intermediate-based crude oils and naphthene-based crude oils; distillates obtained through reduced-pressure distillation of such atmospheric residues; and mineral oils obtained by purifying the distillates through one or more purification treatments of solvent deasphalting, solvent extraction, hydrocracking, solvent dewaxing, catalytic dewaxing, or hydrorefining.

Examples of the synthetic oil include poly-α-olefins such as α-olefin homopolymers and α-olefin copolymers (e.g., α-olefin copolymers having 8 to 14 carbon atoms such as ethylene-α-olefin copolymers); isoparaffin; various esters such as polyol esters and dibasic acid esters (but excluding the ester-based synthetic oil (A1)); various ethers such as polyphenyl ether; polyalkylene glycols; alkylbenzenes; alkylnaphthalenes; and GTL base oils obtained by isomerizing a wax produced from a natural gas through Fischer-Tropsch synthesis (gas-to-liquid (GTL) wax).

For the other base oil (A2), one alone or plural kinds of mineral oils can be used either singly or as combined, or one alone or plural kinds of synthetic oils can be used either singly or as combined. Also one or more kinds of mineral oils and one or more kinds of synthetic oils can be used as combined.

Here, as the other base oil (A2), a mineral oil is preferred. Using the ester-based synthetic oil (A1) as combined with a mineral oil, a lubricating oil composition which can have more improved electrical insulation and can ensure a sufficient cooling performance without greatly lowering the cooling performance and which can therefore ensure an extremely excellent balance of cooling performance and electrical insulation can be prepared.

From the viewpoint, the content of the mineral oil is, based on the total amount of the base oil (A), preferably 10% by mass or more, more preferably 30% by mass or more, even more preferably 40% by mass or more. Also preferably, it is 70% by mass or less, more preferably 60% by mass or less. The upper limit and the lower limit of these numeral ranges can be combined in any manner. Specifically, the content is preferably 10% by mass to 70% by mass, more preferably 30% by mass to 60% by mass, even more preferably 40% by mass to 60% by mass.

The content ratio of the ester-based synthetic oil (A1) to the mineral oil [(ester-based synthetic oil (A1))/(mineral oil)] is, as a ratio by mass, preferably 30/70 or more, more preferably 40/60 or more. Also preferably, it is 90/10 or less, more preferably 70/30 or less, even more preferably 60/40 or less. The upper limit and the lower limit of these numeral ranges can be combined in any manner.

Specifically, the content ratio is preferably 30/70 to 90/10, more preferably 40/60 to 70/30, even more preferably 40/60 to 60/40.

<<Additives>>

The lubricating oil composition of one embodiment of the present invention can contain, as needed and within a range not detracting from the advantageous effects of the invention, additives such as antiwear agent, antioxidant, viscosity index improver, rust inhibitor, metal deactivator, antifoaming agent, and detergent dispersant.

One alone or two or more kinds of these additives can be used as combined.

Though not specifically limited, the total content of these additives is, for example, approximately 0 to 20% by weight based on the total amount of the composition.

<Antiwear Agent>

Not specifically limited, the antiwear agent can be appropriately selected from ordinary antiwear agents heretofore used in lubricating oils. For example, in the case where an electric motor and a gear reducer are combined for use in a hybrid vehicle or an electric vehicle, preferably, one or more selected from neutral phosphorus compounds, acidic phosphite esters or amine salts thereof and sulfur compounds is used so as not to worsen electrical insulation as much as possible.

The content of the antiwear agent is, though not specifically limited thereto, for example, approximately 0.01 to 5% by weight based on the total amount of the composition.

The neutral phosphorus compound includes aromatic neutral phosphates such as tricresyl phosphate, triphenyl phosphate, trixylenyl phosphate, tricresylphenyl phosphate, tricresyl thiophosphate, and triphenyl thiophosphate; aliphatic neutral phosphates such as tributyl phosphate, tri-2-ethylhexyl phosphate, tributoxy phosphate, and tributyl thiophosphate; aromatic neutral phosphites such as triphenyl phosphite, tricresyl phosphite, trisnonylphenyl phosphite, diphenyl-mono-2-ethylhexyl phosphite, diphenyl-monotridecyl phosphite, tricresyl thiophosphite, and triphenyl thiophosphite; and aliphatic neutral phosphites such as tributyl phosphite, trioctyl phosphite, trisdecyl phosphite, tristridecyl phosphite, trioleyl phosphite, tributyl thiophosphite, and trioctyl thiophosphite. These can be used singly, or can be used as a combination of two or more thereof.

The acidic phosphite ester includes aliphatic acidic phosphate amine salts such as di-2-ethylhexyl acid phosphate amine salt, dilauryl acid phosphate amine salt, and dioleyl acid phosphate amine salt; aliphatic acidic phosphite esters and amine salts thereof such as di-2-ethylhexylhydrogen phosphite, dilaurylhydrogen phosphite, and dioleylhydrogen phosphite; aromatic acidic phosphate amine salts such as diphenyl acid phosphate amine salt, and dicresyl acid phosphate amine salt; aromatic acidic phosphite esters and amine salts thereof such as diphenylhydrogen phosphite, and dicresylhydrogen phosphite; sulfur-containing acidic phosphate amine salts such as S-octylthioethyl acid phosphate amine salt, and S-dodecylthioethyl acid phosphate amine salt; and sulfur-containing acidic phosphite esters and amine salts thereof such as S-octylthioethylhydrogen phosphite, and S-dodecylthioethylhydrogen phosphite. These can be used singly, or can be used as a combination of two or more thereof.

Various sulfur compounds are usable, and examples thereof include thiadiazol compounds, polysulfide compounds, dithiocarbamate compounds, sulfurized oil and fat compounds, and sulfurized olefin compounds. These can be used singly, or can be used as a combination of two or more thereof.

<Antioxidant>

As the antioxidant, any one can be appropriately selected from known antioxidants heretofore used in lubricating oils. Examples thereof include amine-based antioxidants (diphenylamines, naphthylamines), phenol-based antioxidants, molybdenum-based antioxidants, sulfur-based antioxidants, and phosphorus-based antioxidants. The antioxidant can be used singly, or can be used as a combination of two or more thereof. Not specifically limited, the content of the antioxidant can be, for example, approximately 0.05 to 7% by weight based on the total amount of the composition.

<Viscosity Index Improver>

Examples of the viscosity index improver include polymethacrylates, dispersant-type polymethacrylates, olefin copolymers (e.g., ethylene-propylene copolymers), dispersant-type olefin copolymers, and styrene copolymers (e.g., styrene-diene copolymers, styrene-isoprene copolymers). The viscosity index improver can be used singly, or can be used as a combination of two or more thereof. Not specifically limited but from the viewpoint of the blending effect, the blending amount (in terms of resin content) of the viscosity index improver can be, for example, approximately 0.1% by weight or more and 10% by weight or less based on the total amount of the composition.

<Rust Inhibitor>

Examples of the rust inhibitor include fatty acids, alkenylsuccinic acid half esters, fatty acid soaps, alkylsulfonic acid salts, polyhydric alcohol fatty acid esters, fatty acid amides, oxidized paraffins, and alkylpolyoxyethylene ethers. The rust inhibitor can be used singly, or can be used as a combination of two or more thereof. Not specifically limited, a preferred blending amount of the rust inhibitor is approximately 0.01% by weight or more and 3% by weight or less based on the total amount of the composition.

<Metal Deactivator>

Examples of the metal deactivator include benzotriazole, triazole derivatives, benzotriazole derivatives, and thiadiazole derivatives. The metal deactivator can be used singly, or can be used as a combination of two or more thereof. Not specifically limited, the content of the metal deactivator is preferably 0.01 to 5% by weight based on the total amount of the composition.

<Antifoaming Agent>

Examples of the antifoaming agent include silicone compounds such as dimethylpolysiloxane; and polyacrylates. The antifoaming agent can be used singly, or can be used as a combination of two or more thereof. Not specifically limited, the content of the antifoaming agent can be approximately 0.001 to 0.5% by weight based on the total amount of the composition.

<Detergent Dispersant>

Examples of the detergent dispersant include succinic acid imide compounds, boron imide compounds and acid amide compounds. The detergent dispersant can be used singly, or can be used as a combination of two or more thereof. Not specifically limited, the content of the detergent dispersant is preferably 0.1 to 20% by weight based on the total amount of the composition.

[Properties of Lubricating Oil Composition]

The lubricating oil composition of one embodiment of the present invention preferably satisfies the requirements (1) to (3) as defined hereinabove as the requirements for the base oil (A). In addition to the requirements (1) to (3), one or more selected from the requirements (4) to (7) is preferably satisfied, more preferably two or more, even more preferably three or more, and further more preferably all four are satisfied.

In the case where the physical data of the lubricating oil composition of one embodiment of the present invention are defined by the requirements (1) to (7), preferred conditions of these requirements (1) to (7) are as described hereinabove.

[Use of Lubricating Oil Composition]

The lubricating oil composition of the present invention has excellent cooling performance, ensures electrical insulation and has a high flash point. In addition, it also ensures lubricity.

Consequently, the lubricating oil composition of the present invention can be favorably used as a cooling oil for cooling various devices. In particular, it can be favorably used as a cooling oil for cooling electric vehicle devices for an electric vehicle.

Specifically, for example, the lubricating oil composition can be favorably used as a cooling oil for cooling electric vehicle devices of one or more selected from the group consisting of motors, generators, electric storage devices, converters, inverters, engines and transmissions.

The motor can be a motor dedicated to driving or can be a motor also serving as a generator.

The generator mentioned above as an electric vehicle device means a generator mounted separately from a motor serving also as a generator.

Examples of the electric storage devices includes a battery and a capacitor.

One embodiment of the present invention provides a use method of using the lubricating oil composition of the present invention for cooling electric vehicle devices of the electric vehicle. The electric vehicle devices include, as described above, one or more selected from motors, generators, electric storage devices, converters, inverters, engines and transmissions.

[Cooling System]

The lubricating oil composition of the present invention has excellent cooling performance, ensures electrical insulation and has a high flash point. In addition, it also ensures lubricity.

Consequently, for example, by circulating through various devices such as electric vehicle devices, the lubricating oil composition of the present invention can lubricate and cool the devices.

Here, one embodiment of the present invention provides a cooling system for cooling electric vehicle devices, which is provided with the lubricating oil composition of the present invention. Examples of the electric vehicle devices are, as described above, one or more from the group consisting of motors, generators, electric storage devices, converters, inverters, engines and transmissions.

The cooling system is provided with a circulation circuit through which the lubricating oil composition circulates, and a cooling target portion. The cooling target portion is the above-mentioned device (preferably the above-mentioned electric vehicle device). The cooling mode for the cooling target portion may be any of a direct cooling mode or an indirect cooling mode, and can be appropriately defined in accordance with the cooling mode required for the device (preferably the electric vehicle device). The cooling system can be further provided with a feeder for feeding the lubricating oil composition to the via the circulation circuit. In addition, the system can be further provided with a sensor part to monitor the temperature of the cooling target portion and a controller to control the operation of the feeder in accordance with the temperature monitored by the sensor part.

In the present description, the "cooling system" means an "object" in which a plurality of components including at least the circulation circuit and the cooling target portion are collected to exhibit a function of cooling the cooling target portion, and can also be referred to as a "device" in which a plurality of components is combined to perform a function of cooling the cooling target portion.

[Production Method for Lubricating Oil Composition]

The production method for the lubricating oil composition of the present invention is not specifically limited. The production method for the lubricating oil composition of one embodiment includes a step of preparing a base oil (A), which contains an ester-based synthetic oil (A1), in which the content of the ester-based synthetic oil (A1) is 30% by mass to 100% by mass (based on the total amount of the base oil (A)), the ester-based synthetic oil (A1) is one or more selected from the group consisting of an ester (A1-1) of a monohydric alcohol and a monobasic acid and an ester (A1-2) of a monohydric alcohol and a polybasic acid, and in which the base oil (A) satisfies the following requirements (1) to (3):

Requirement (1): the kinematic viscosity at 40° C. is 2.00 mm²/s to 4.00 mm²/s,

Requirement (2): the specific heat at 20° C. is 1.75 kJ/(kg·K) or less,

Requirement (3): the density at 20° C. is 0.850 g/cm³ or more.

The base oil (A) is prepared so as to further satisfy preferably at least one, more preferably two or more, even more preferably three or more and further more preferably four of the above-mentioned requirements (4) to (7). Preferred conditions for the above-mentioned requirements (1) to (7) are as described above.

The method can further include a step of optionally mixing additives in the base oil (A). The additives can be blended in any method, and the blending order and the blending method are not limited.

Embodiments of the Invention Provided

The present invention provides the following embodiments [1] to [9].

[1] A lubricating oil composition comprising a base oil (A), wherein:

the base oil (A) comprises an ester-based synthetic oil (A1), the content of the ester-based synthetic oil (A1) is 30% by mass to 100% by mass based on the total amount of the base oil (A), the ester-based synthetic oil (A1) is one or more selected from the group consisting of an ester (A1-1) of a monohydric alcohol and a monobasic acid and an ester (A1-2) of a monohydric alcohol and a polybasic acid, and the base oil (A) satisfies the following requirements (1) to (3):

Requirement (1): the kinematic viscosity at 40° C. is 2.00 mm²/s to 4.00 mm²/s,

Requirement (2): the specific heat at 20° C. is 1.75 kJ/(kg·K) or less,

Requirement (3): the density at 20° C. is 0.850 g/cm³ or more.

[2] The lubricating oil composition according to [1], wherein the base oil (A) further satisfies the following requirement (4):

Requirement (4): the thermal conductivity at 20° C. is 0.140 W/(m·K) or more.

[3] The lubricating oil composition according to [1] or [2], wherein the base oil (A) further satisfies the following requirement (6):

Requirement (6): the flash point according to a Cleveland open-cup method is 105° C. or higher.

[4] The lubricating oil composition according to any of [1] to [3], wherein the base oil (A) further satisfies the following requirement (7):

Requirement (7): the volume resistivity at 25° C. is 0.03×10⁷ Ω·m or more.

[5] The lubricating oil composition according to any of [1] to [4], wherein the ester-based synthetic oil (A1) is an ester (A1-2) of a monohydric alcohol and a polybasic acid.

[6] The lubricating oil composition according to any of [1] to [5], which is used for cooling an electric vehicle device.

[7] The lubricating oil composition according to [6], wherein the electric vehicle device is at least one selected from motors, batteries, inverters, engines and transmissions.

[8] A use method of using the lubricating oil composition according to any of the above [1] to [7] for cooling an electric vehicle device.

[9] A cooling system for cooling an electric vehicle device, provided with the lubricating oil composition according to any of [1] to [7].

EXAMPLES

The present invention is described more specifically with reference to the following Examples, but the present invention is not limited to the following Examples.

Examples 1 to 4 and Comparative Examples 1 to 6

One alone or two of the following base oils were used either singly or as combined as shown in Table 1 to prepare lubricating oil compositions of Examples 1 to 4 and Comparative Examples 1 to 6.

Details of the base oils used in Examples 1 to 4 and Comparative Examples 1 to 6 are as mentioned below.

<Base Oil (A)>

(Ester-Based Synthetic Oil (A1))

Diethyl adipate (ester of adipic acid (hexane diacid) and ethanol)

Dimethyl adipate (ester of adipic acid (hexane diacid) and methanol)

2-Ethylhexyl caprylate (ester of caprylic acid (octanoic acid) and 2-ethylhexanol)

2-Ethylhexyl oleate (ester of oleic acid and 2-ethylhexanol)

Bis(2-ethylhexyl) azelate (ester of azelaic acid and 2-ethylhexanol) Diethyl adipate, dimethyl adipate and bis (2-ethylhexyl) azelate are esters of a monohydric alcohol and a polybasic acid (dibasic acid).

2-Ethylhexyl caprylate and 2-ethylhexyl oleate are ester of a monohydric alcohol and a monobasic acid.

Mineral oil 1 (corresponding to VG2)

Mineral oil 2 (corresponding to VG5): this corresponds to the above-mentioned mineral oil (a).

Ethylene glycol

<Method for Measurement of Various Physical Data>

Various properties of the lubricating oil compositions of Examples 1 to 4 and Comparative Examples 1 to 6 were measured and calculated according to the process mentioned below. In these Examples, investigations were made without blending any other additive than the base oil, and therefore the properties of the lubricating oil compositions are also the properties of the base oils.

(1) 40° C. kinematic viscosity and 100° C. kinematic viscosity

Measured according to JIS K2283:2000.

(2) 20° C. kinematic viscosity

From the found data of the 40° C. kinematic viscosity and 100° C. kinematic viscosity, the 20° C. kinematic viscosity was calculated according to JIS K2283:2000.

(3) Density at 20° C.

Measured according to JIS K 2249-1:2011 (Crude and Refined Products—Method for Measuring Density—Part 1: Oscillation Method).

(4) Specific heat at 20° C.

Using a thermal conductivity measuring apparatus (by C-Therm Technologies Ltd., TCi), a value of thermal conductivity and a value of thermal effusivity were measured, and the specific heat was calculated according to the above-mentioned formula (f1). The density at 20° C. is the value measured in the above (3).

(5) Thermal conductivity at 20° C.

Using a thermal conductivity measuring apparatus (by C-Therm Technologies Ltd., TCi), the thermal conductivity at 20° C. was measured.

(6) Flash point

Measured by a Cleveland open-cup method (COC method) according to JIS K 2265-4:2007.

(7) Volume resistivity at 25° C.

Measured under the condition of a measurement temperature 25° C. and an applied voltage 250 V, according to JIS C2101:1999.

<Calculation of Relative Heat Transfer Coefficient>

From the density at 20° C., the specific heat at 20° C., the thermal conductivity at 20° C. and the kinematic viscosity at 20° C. measured as above, the heat transfer coefficient at 20° C. of the lubricating oil compositions of Examples 1 to 4 and Comparative Examples 1 to 6 was calculated according to the above formula (I).

Then, relative to the heat transfer coefficient of Comparative Example 4 (using the mineral oil 2 corresponding to the mineral oil (a)) referred to as 1.00, the heat transfer coefficient of Examples 1 to 4, Comparative Examples 1 to 3, and Comparative Examples 5 to 6 was calculated and referred to as a relative heat transfer coefficient thereof.

<Evaluation>

In these Examples, lubricating oil compositions (base oils) having a relative heat transfer coefficient of 1.05 or more (the requirement (5)), having a flash point of 105° C. or higher (the requirement (6)), and having a volume resistivity of $0.03 \times 10^7$ Ω·m or more (the requirement (7)) were accepted as good.

The results are shown in Table 1.

TABLE 1

| | | | Example 1 | Example 2 | Example 3 | Example 4 | Comparative Example 1 | Comparative Example 2 |
|---|---|---|---|---|---|---|---|---|
| Formulation of Lubricating Oil Composition (Formulation of Base Oil) | Diethyl adipate | mass % | 100 | — | — | 30 | — | — |
| | Dimethyl adipate | mass % | — | 100 | — | — | — | — |
| | 2-Ethylhexyl caprylate | mass % | — | — | 100 | — | — | — |
| | 2-Ethylhexyl oleate | mass % | — | — | — | — | 100 | — |
| | Bis(2-ethylhexyl) azelate | mass % | — | — | — | — | — | 100 |
| | Mineral oil 1 | mass % | — | — | — | — | — | — |
| | Mineral oil 2 | mass % | — | — | — | 70 | — | — |
| | Ethylene glycol | mass % | — | — | — | — | — | — |
| | Water | mass % | — | — | — | — | — | — |
| Properties | Requirement (1) | Kinematic viscosity, 40° C. | mm²/s | 2.27 | 2.02 | 2.71 | 3.04 | 8.33 | 10.7 |
| | — | Kinematic viscosity, 20° C. | mm²/s | 3.54 | 3.39 | 4.41 | 4.93 | 14.9 | 20.9 |
| | — | Kinematic viscosity, 100° C. | mm²/s | 0.969 | 0.880 | 1.08 | 1.20 | 2.70 | 3.00 |
| | Requirement (2) | Specific heat, 20° C. | kJ/(kg · K) | 1.64 | 1.57 | 1.71 | 1.66 | 1.87 | 1.77 |
| | Requirement (3) | Density, 20° C. | g/cm³ | 0.986 | 1.06 | 0.860 | 0.896 | 0.867 | 0.917 |
| | Requirement (4) | Thermal conductivity, 20° C. | W/(m · K) | 0.156 | 0.160 | 0.144 | 0.149 | 0.152 | 0.152 |
| | Requirement (5) | Relative heat transfer coefficient | — | 1.25 | 1.29 | 1.11 | 1.12 | 0.968 | 0.915 |
| | Requirement (6) | Flash point | ° C. | 128 | 116 | 132 | 127 | 220 | 222 |
| | Requirement (7) | Volume resistivity, 25° C. | 10⁷ Ωm | 4.5 | 6.7 | 7.3 | 110 | 400 | 8.0 |

| | | | Comparative Example 3 | Comparative Example 4 | Comparative Example 5 | Comparative Example 6 |
|---|---|---|---|---|---|---|
| Formulation of Lubricating Oil Composition (Formulation of Base Oil) | Diethyl adipate | mass % | — | — | — | — |
| | Dimethyl adipate | mass % | — | — | — | — |
| | 2-Ethylhexyl caprylate | mass % | — | — | — | — |
| | 2-Ethylhexyl oleate | mass % | — | — | — | — |
| | Bis(2-ethylhexyl) azelate | mass % | — | — | — | — |
| | Mineral oil 1 | mass % | 100 | — | — | — |
| | Mineral oil 2 | mass % | — | 100 | — | — |
| | Ethylene glycol | mass % | — | — | 100 | 50 |
| | Water | mass % | — | — | — | 50 |
| Properties | Requirement (1) | Kinematic viscosity, 40° C. | mm²/s | 2.17 | 4.08 | 8.25 | 2.00 |
| | — | Kinematic viscosity, 20° C. | mm²/s | 3.38 | 7.06 | 19.5 | 3.47 |
| | — | Kinematic viscosity, 100° C. | mm²/s | <1.00 | 1.45 | 1.88 | <1.00 |
| | Requirement (2) | Specific heat, 20° C. | kJ/(kg · K) | 1.70 | 1.67 | 2.30 | 2.41 |

TABLE 1-continued

| Requirement (3) | Density, 20° C. | $g/cm^3$ | 0.833 | 0.857 | 1.09 | 1.05 |
|---|---|---|---|---|---|---|
| Requirement (4) | Thermal conductivity, 20° C. | $W/(m \cdot K)$ | 0.140 | 0.141 | 0.290 | 0.244 |
| Requirement (5) | Relative heat transfer coefficient | — | 1.12 | 1.00 | 1.65 | 1.96 |
| Requirement (6) | Flash point | ° C. | 101 | 142 | 118 | none |
| Requirement (7) | Volume resistivity, 25° C. | $10^7 \, \Omega m$ | 18700000 | 441000 | 0.023 | unmeasurable |

The results in Table 1 confirm the following.

It is known that the lubricating oil compositions (base oils) of Examples 1 to 4 containing the ester-based synthetic oil (A1) in an amount of 30% by mass or more based on the total amount of the base oil (A) and satisfying all the requirements (1) to (3) satisfy all the requirement (5) defining the relative heat transfer coefficient, the requirement (6) defining the flash point and the requirement (7) defining the volume resistivity.

As opposed to these, it is known that the lubricating oil compositions (base oils) of Comparative Examples 1 and 2 containing the ester-based synthetic oil (A1) in an amount of 30% by mass or more based on the total amount of the base oil (A) but not satisfying the requirements (1) and (2) do not satisfy the requirement (5) defining the relative heat transfer coefficient.

Also it is known that the lubricating oil compositions (base oils) of Comparative Examples 3 and 4 in which the base oil (A) is a mineral oil alone and in which the content of the ester-based synthetic oil (A1) is not 30% by mass or more based on the total amount of the base oil (A) do not satisfy the requirement (6) defining the flash point or the requirement (5) defining the relative heat transfer coefficient. Specifically, it is known that, when the requirement (3) is not satisfied, then the requirement (6) defining the flash point is not satisfied, and when the requirement (1) is not satisfied, then the requirement (5) defining the relative heat transfer coefficient is not satisfied.

Also it is known that the lubricating oil compositions (base oils) of Comparative Examples 5 and 6 in which the base oil (A) is only ethylene glycol or only a mixture of ethylene glycol and water and in which the content of the ester-based synthetic oil (A1) is not 30% by mass or more based on the total amount of the base oil (A) do not satisfy the requirement (7) defining the volume resistivity.

The invention claimed is:

1. A method of cooling an electric vehicle device, comprising:

applying a lubricating oil composition comprising a base oil to an electric vehicle device, wherein the base oil comprises an ester-based synthetic oil such that the content of the ester-based synthetic oil is in a range of 30% by mass to 100% by mass based on the total amount of the base oil, the ester-based synthetic oil is at least one selected from the group consisting of a first ester of a first monohydric alcohol and a monobasic acid and a second ester of a second monohydric alcohol and a polybasic acid, the first monohydric alcohol includes at least one selected from the group consisting of methanol, ethanol, and octanol, the monobasic acid includes a fatty acid having 6 to 8 carbon atoms, the second monohydric alcohol has a carbon number of 1 to 8 and has no aromatic group, the polybasic acid includes a dibasic acid having 4 to 8 carbon atoms and having no aromatic group, and the base oil has a flash point of 105° C. or higher and 200° C. or lower according to a Cleveland open-cup method, a kinematic viscosity in a range of 2.00 mm²/s to 4.00 mm²/s at 40° C., a specific heat of 1.75 kJ/(kg·K) or less at 20° C., and a density of 0.850 g/cm³ or more at 20° C.

2. The method according to claim 1, wherein the base oil has a thermal conductivity of 0.140 W/(m·K) or more at 20° C.

3. The method of claim 1, wherein the base oil has a volume resistivity of 0.03×10⁷Ω·m or more at 25° C.

4. The method of claim 1, wherein the ester-based synthetic oil is the second ester.

5. A method of cooling an electric vehicle device, comprising:

applying a lubricating oil composition comprising a base oil to an electric vehicle device, wherein the base oil comprises an ester-based synthetic oil such that the content of the ester-based synthetic oil is in a range of 30% by mass to 100% by mass based on the total amount of the base oil, the ester-based synthetic oil is at least one selected from the group consisting of a first ester of a first monohydric alcohol and a monobasic acid and a second ester of a second monohydric alcohol and a polybasic acid, the first monohydric alcohol includes at least one selected from the group consisting of methanol, ethanol, the monobasic acid includes a fatty acid having 6 to 8 carbon atoms, the second monohydric alcohol has a carbon number of 1 to 8 and has no aromatic group, the polybasic acid includes a dibasic acid having 4 to 8 carbon atoms and having no aromatic group, the base oil has a flash point of 105° C. or higher and 200° C. or lower according to a Cleveland open-cup method, a kinematic viscosity in a range of 2.00 mm²/s to 4.00 mm²/s at 40° C., a specific heat of 1.75 KJ/(kg·K) or less at 20° C., and a density of 0.850 g/cm³ or more at 20° C. and the electric vehicle device is at least one selected from motors, generators, electric storage devices, converters, inverters, engines and transmissions.

6. A cooling system for cooling an electric vehicle device, comprising:

a lubricating oil composition comprising a base oil, wherein the base oil comprises an ester-based synthetic oil such that the content of the ester-based synthetic oil is in a range of 30% by mass to 100% by mass based on the total amount of the base oil, the ester-based synthetic oil is at least one selected from the group consisting of a first ester of a first monohydric alcohol and a monobasic acid and a second ester of a second monohydric alcohol and a polybasic acid, the first monohydric alcohol includes at least one selected from the group consisting of methanol, ethanol, and octanol, the monobasic acid includes a fatty acid having 6 to 8 carbon atoms, the second monohydric alcohol has a carbon number of 1 to 8 and has no aromatic group, the polybasic acid includes a dibasic acid having 4 to 8 carbon atoms and having no aromatic group, and the base oil has a flash point 105° C. or higher and 200° C. or lower according to a Cleveland open-cup method, a kinematic viscosity in a range of 2.00 mm$^2$/s to 4.00 mm$^2$/s at 40° C., a specific heat of 1.75 KJ/(kg·K) or less at 20° C., and a density of 0.850 g/cm$^3$ or more at 20° C.

7. The method according to claim 1, wherein the base oil has a relative heat transfer coefficient of 1.05 or more at 20° C.

8. The method according to claim 1, wherein the monobasic acid includes at least one selected from the group consisting of hexanoic acid, octanoic acid, hexenoic acid, heptanoic acid, and octenoic acid.

9. The method according to claim 1, wherein the second monohydric alcohol includes at least one selected from the group consisting of methanol, ethanol, propanol, butanol, pentanol, hexanol, heptanol, octanol, butenol, pentenol, hexenol, heptenol, and octenol.

10. The method according to claim 1, wherein the polybasic acid includes at least one selected from the group consisting of butane-diacid, pentane-diacid, hexane-diacid, heptane-diacid, octane-diacid, butene-diacid, pentene-diacid, hexene-diacid, heptene-diacid, and octene diacid.

11. The cooling system according to claim 6, wherein the base oil has a thermal conductivity of 0.140 W/(m·K) or more at 20° C.

12. The cooling system according to claim 6, wherein the base oil has a volume resistivity of 0.03×10$^7$ Ω·m or more at 25° C.

13. The cooling system according to claim 6, wherein the ester-based synthetic oil is the second ester.

14. The cooling system according to claim 6, wherein the base oil has a relative heat transfer coefficient of 1.05 or more at 20° C.

15. The cooling system according to claim 6, wherein the monobasic acid includes at least one selected from the group consisting of hexanoic acid, octanoic acid, hexenoic acid, heptanoic acid, and octenoic acid.

16. The cooling system according to claim 6, wherein the second monohydric alcohol includes at least one selected from the group consisting of methanol, ethanol, propanol, butanol, pentanol, hexanol, heptanol, octanol, butenol, pentenol, hexenol, heptenol, and octenol.

17. The cooling system according to claim 6, wherein the polybasic acid includes at least one selected from the group consisting of butane-diacid, pentane-diacid, hexane-diacid, heptane-diacid, octane-diacid, butene-diacid, pentene-diacid, hexene-diacid, heptene-diacid, and octene diacid.

18. The cooling system according to claim 6, wherein the ester-based synthetic oil is the first ester.

* * * * *